United States Patent
Ouellette et al.

(10) Patent No.: US 12,443,753 B2
(45) Date of Patent: Oct. 14, 2025

(54) HIGH ASSURANCE ENROLLMENT FOR IDENTITIES

(71) Applicant: Tyco Fire & Security GmbH, Neuhausen am Rheinfall (CH)

(72) Inventors: Jason M. Ouellette, Sterling, MA (US); Brian Rich, Nashua, NH (US); Glenn Kilburn Holton, Braintree, MA (US); Nathan B. O'Mera, Milwaukee, WI (US); Gopal Paripally, North Andover, MA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 115 days.

(21) Appl. No.: 18/526,341

(22) Filed: Dec. 1, 2023

(65) Prior Publication Data

US 2025/0181764 A1 Jun. 5, 2025

(51) Int. Cl.
*G06F 21/62* (2013.01)
*G06F 21/32* (2013.01)
*G06F 21/64* (2013.01)

(52) U.S. Cl.
CPC .......... *G06F 21/6254* (2013.01); *G06F 21/32* (2013.01); *G06F 21/645* (2013.01)

(58) Field of Classification Search
CPC ....... G06F 21/6254; G06F 21/32; G06F 21/64
See application file for complete search history.

(56) References Cited

U.S. PATENT DOCUMENTS

| | | | |
|---|---|---|---|
| 10,204,117 B2 * | 2/2019 | Chau | G06F 16/51 |
| 10,366,250 B1 * | 7/2019 | Chen | G06F 21/6245 |
| 10,790,967 B1 * | 9/2020 | Cottingham | H04L 9/14 |
| 11,093,591 B1 * | 8/2021 | Gillis | H04L 63/08 |
| 11,176,767 B2 * | 11/2021 | Raduchel | G07C 9/29 |
| 11,321,489 B2 * | 5/2022 | Apsingekar | H04L 63/0807 |
| 11,368,307 B1 * | 6/2022 | Ozarkar | H04L 9/3218 |
| 11,646,897 B2 * | 5/2023 | Kravitz | H04L 9/3247 |
| | | | 713/176 |
| 11,997,086 B1 * | 5/2024 | Grinman | H04L 63/083 |
| 12,248,545 B1 * | 3/2025 | Bell | G06F 21/32 |
| 12,301,614 B1 * | 5/2025 | Payne | H04L 63/1491 |
| 2008/0109883 A1 * | 5/2008 | Hernoud | G06F 21/602 |
| | | | 726/19 |
| 2008/0209506 A1 * | 8/2008 | Ghai | G06F 21/604 |
| | | | 726/16 |

(Continued)

*Primary Examiner* — Darren B Schwartz
(74) *Attorney, Agent, or Firm* — ArentFox Schiff LLP

(57) ABSTRACT

A method and apparatus for facilitating user enrollment by a secure server of a trusted source includes receiving, from a user device, personal identifiable information (PII) of the user. The aspects include securely storing the PII. The aspects include receiving, from a requesting authority that is attempting to enroll the user, an identifier of the user and a request for an attestation of a fact attributable to the user that is evaluated for enrollment. The aspects include comparing the identifier of the user and the fact attributable to the user to the PII to find a match. The aspects include minimizing a sharing of the PII user with the requesting authority by confirming, to the requesting authority, the attestation of the fact attributable to the user together with the identifier of the user in place of at least some of the PII, responsive to a comparison result indicating the match.

25 Claims, 7 Drawing Sheets

(56) References Cited

U.S. PATENT DOCUMENTS

| | | | |
|---|---|---|---|
| 2009/0265773 A1* | 10/2009 | Schultz | G06F 16/9535 726/7 |
| 2011/0231329 A1* | 9/2011 | Vianello | G06Q 10/1053 705/321 |
| 2013/0111570 A1* | 5/2013 | Kaariainen | H04L 63/126 726/5 |
| 2015/0088775 A1* | 3/2015 | McIntire | G06Q 10/00 705/325 |
| 2015/0095999 A1* | 4/2015 | Toth | H04L 9/3263 726/6 |
| 2016/0373440 A1* | 12/2016 | Mather | G06F 21/6218 |
| 2018/0052981 A1* | 2/2018 | Nygate | G06N 20/00 |
| 2018/0227131 A1* | 8/2018 | Ebrahimi | H04L 9/3297 |
| 2018/0337778 A1* | 11/2018 | Scheiblauer | H04L 9/0866 |
| 2019/0050592 A1* | 2/2019 | Grau | G06F 21/629 |
| 2019/0074006 A1* | 3/2019 | Kumar | G10L 15/1815 |
| 2019/0092279 A1* | 3/2019 | Jarvis | H04L 9/3297 |
| 2019/0095835 A1* | 3/2019 | Jarvis | G06Q 10/06 |
| 2019/0096021 A1* | 3/2019 | Jarvis | G07F 17/0057 |
| 2019/0149334 A1* | 5/2019 | Van Der Velden | H04L 9/0877 713/185 |
| 2019/0387002 A1* | 12/2019 | Ford | H04L 63/1433 |
| 2020/0007336 A1* | 1/2020 | Wengel | G06F 16/1824 |
| 2020/0226600 A1* | 7/2020 | Cao | G06Q 20/388 |
| 2021/0125615 A1* | 4/2021 | Medalion | G06N 3/044 |
| 2021/0385190 A1* | 12/2021 | Jasper | G06F 21/31 |
| 2022/0067735 A1* | 3/2022 | Tinnon | H04L 9/3213 |
| 2022/0078008 A1* | 3/2022 | Kong | G06F 21/645 |
| 2022/0191048 A1* | 6/2022 | Day | H04L 9/3268 |
| 2022/0335153 A1* | 10/2022 | Herman | G06N 3/094 |
| 2022/0393882 A1* | 12/2022 | Shaffer | H04L 9/3263 |
| 2022/0407853 A1* | 12/2022 | Henry | G06N 20/00 |
| 2023/0206219 A1* | 6/2023 | Khuong | G06Q 20/3825 705/75 |
| 2023/0206371 A1* | 6/2023 | Seidlitz | G06F 21/10 705/320 |
| 2023/0229790 A1* | 7/2023 | Mozer | G06F 21/53 726/26 |
| 2023/0259922 A1* | 8/2023 | Rao | H04L 9/3213 |
| 2024/0013601 A1* | 1/2024 | Saleh | G07C 9/22 |
| 2024/0086502 A1* | 3/2024 | Bartling | G06F 21/31 |
| 2024/0112177 A1* | 4/2024 | Maier | G06Q 40/00 |
| 2024/0265141 A1* | 8/2024 | Rattner | G06F 21/6245 |
| 2024/0323022 A1* | 9/2024 | Herlands | H04L 9/3239 |
| 2024/0380741 A1* | 11/2024 | Jogand-Coulomb | H04L 63/08 |
| 2025/0038956 A1* | 1/2025 | Madhavapeddi | G06F 21/6245 |
| 2025/0071108 A1* | 2/2025 | Maddukuri | H04L 63/0838 |

* cited by examiner

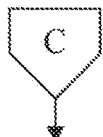

400

Providing a recommendation to the requesting authority to deactivate the user from a remote access system responsive to the match no longer existing. — 450A1A Using an attestation neural network based model that learns which of the PII to supplant by the attestation in the secure transmission to the server of the requesting authority. — 450B Configuring the attestation neural network based model to receive the PII of the user and a plurality of seed redaction rules for supplanting certain items of the PII by the attestation. — 450B1

Configuring the attestation neural network based model to generate new rules to supplant identical items from the PII of the user across different types of credentials to reduce the sharing of the PII of the user. In this way, a learning model may be created that learns what to supplant from new credentials based on matches to items that are supplanted in other credentials. — 450B2

End

FIG. 7

HIGH ASSURANCE ENROLLMENT FOR IDENTITIES

TECHNICAL FIELD

Aspects of the present disclosure relate generally to systems and methods for high assurance enrollment for identities.

BACKGROUND

Enrollment is a process that is pervasively encountered in many scenarios. For example, one may have to enroll with a service that enables checks of their credentials in order for them to work, travel, and/or so forth. As further example, a user may have to enroll in a service that authenticates their work credentials by providing one or more items of personal identifying information (PII). In such a case, it is desired to identify the person with high assurance while minimizing the amount of PII shared with the service.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

According to aspects of the present disclosure, a computer-implemented method for facilitating user enrollment by a secure server of a trusted source. The method includes receiving, in a secure transmission from an application of a mobile computing device of a user, personal identifiable information (PII) of the user. The method further includes securely storing the PII of the user. The method also includes receiving, from a server of a requesting authority that is attempting to enroll the user, an identifier of the user and a request for an attestation of at least one fact attributable to the user that is evaluated for enrollment. The method additionally includes comparing the identifier of the user and the at least one fact attributable to the user to the PII of the user to find a match. The method further includes minimizing a sharing of the PII of the user with the requesting authority that is attempting to enroll the user by confirming, in a secure transmission to the server of the requesting authority, the attestation of the at least one fact attributable to the user together with the identifier of the user in place of at least some of the PII, responsive to a comparison result indicating the match.

According to other aspects of the present disclosure, a computer program product configured to facilitate user enrollment by a secure server of a trusted source is provided. The computer program product comprising one or more non-transitory computer-readable media, having instructions stored thereon that when executed by one or more processors cause the one or more processors, individually or in combination, to perform a method. The method includes receiving, in a secure transmission from an application of a mobile computing device of a user, personal identifiable information (PII) of the user. The method includes securely storing the PII of the user. The method further includes receiving, from a server of a requesting authority that is attempting to enroll the user, an identifier of the user and a request for an attestation of at least one fact attributable to the user that is evaluated for enrollment. The method also includes comparing the identifier of the user and the at least one fact attributable to the user to the PII of the user to find a match. The method additionally includes minimizing a sharing of the PII of the user with the requesting authority that is attempting to enroll the user by confirming, in a secure transmission to the server of the requesting authority, the attestation of the at least one fact attributable to the user together with the identifier of the user in place of at least some of the PII, responsive to a comparison result indicating the match.

According to yet other aspects of the present disclosure, a server of a trusted server configured to facilitate user enrollment is provided. The server includes one or more memory devices having program code stored thereon. The server further includes one or more processors, operatively coupled to the one or more memory devices, for running the program code, individually or in combination, to perform actions described herein, including to receive, in a secure transmission from an application of a mobile computing device of a user, personal identifiable information (PII) of the user. The one or more processors further run the program code to securely store the PII of the user in at least one of the one or more memory devices. The one or more processors also run the program code to receive, from a server of a requesting authority that is attempting to enroll the user, an identifier of the user and a request for an attestation of at least one fact attributable to the user that is evaluated for enrollment. The one or more processors additionally run the program code to compare the identifier of the user and the at least one fact attributable to the user to the PII of the user to find a match. The one or more processors further run the program code to minimize a sharing of the PII of the user with the requesting authority that is attempting to enroll the user by confirming, in a secure transmission to the server of the requesting authority, the attestation of the at least one fact attributable to the user together with the identifier of the user in place of at least some of the PII, responsive to a comparison result indicating the match.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

FIGS. 4-7 illustrate a flowchart of an example of a method for facilitating user enrollment by a secure server of a trusted source, in accordance with example aspects of this disclosure.

DETAILED DESCRIPTION

Figure 1:
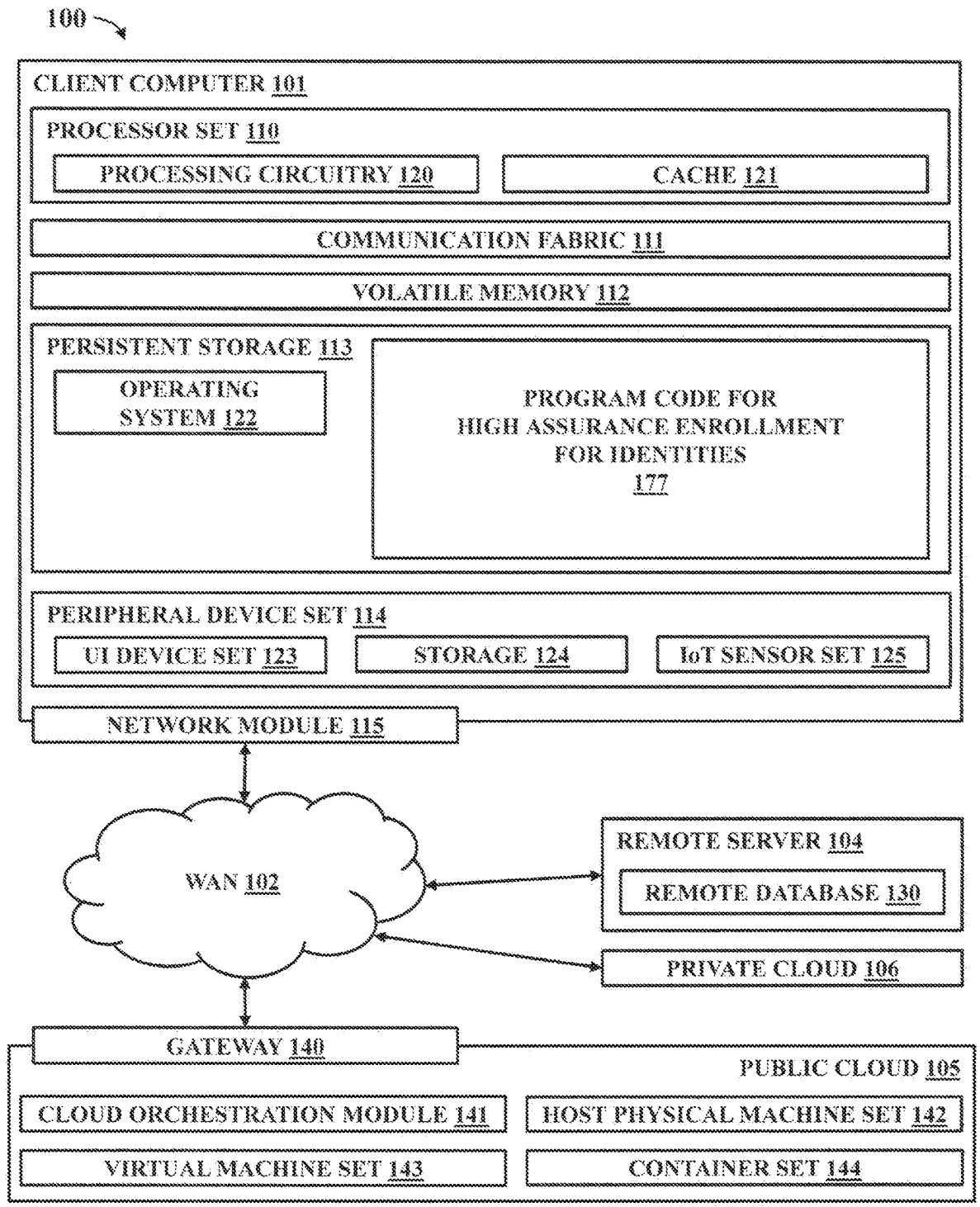
FIG. 1 illustrates a block diagram of an example of a computer environment, in accordance with example aspects of this disclosure.

Aspects of the present disclosure are directed to systems and methods for high assurance enrollment for identities.

In an aspect, systems and methods are provided that allow a user to enroll in a "service" or with an "entity," also collectively referred to herein as a "requesting authority," with high assurance of their identity and any other personal identifying information (PII) of the user specifically required for enrollment while minimizing the amount of other PII of the user that is shared with the requesting authority. In this way, the minimum amount of PII of the user is provided to the requesting authority to enable enrollment while shielding other PII of the user from the requesting authority.

To achieve this minimization of the amount of PII shared with a requesting authority, aspects of the present disclosure replace the exposure of, for example, some or all PII present on a given credential, with a directed confirmation or a denial of an attestation of at least one fact attributable to the user that appears on the credential and that is the subject of verification by the requesting authority. In this way, a binary answer directed to the attestation of one or more specific facts attributable to the user can be made known to the requesting authority without having to physically or digitally present the credential or a copy of the credential and risking exposure of more PII than is required to enable enrollment.

The user provides enrolls though an application on their mobile computing device (i.e., a smart phone). In an aspect, the application may be a wallet application including financial transaction information (debit/credit card numbers, bank account numbers, etc.). In another aspect, the wallet application may be a non-wallet application lacking financial transaction information.

The application on the mobile computer device initially identifies the user, for example, using biometrics such as retina, face, speech, and/or fingerprint recognition. In other aspects, non-biometric information may be used to initially identify the user such as a personal identification number (PIN) and/or so forth. Upon verifying the identity of the user, the application on the mobile computer device is enabled for use in high assurance enrollment in conjunction with the use of a trusted source that provides the attestations.

That is, attestation of the at least one fact attributable to the user is performed by a trusted source. The trusted source is one that is pre-agreed upon by the parties as a trusted party for an information exchange that is configured to limit the amount of PII of the user that is shared with requesting authorities by the use of attestations of at least one fact attributable to the user.

In an aspect, the user registers with server of the trusted source through the application on the mobile computing device of the user. To that end, the user provides proof of identity and other pertinent PII that is stored on the server of the trusted source and may also be concurrently stored in the application on the mobile computing device of the user. In place of providing, for example, a valid driver's license number (or the license itself) and/or a passport number (or the passport itself) and/or a certification number (or the certification itself) and/or a facial image and/or a fingerprint and/or a voiceprint, to the requesting authority to confirm a fact(s) attributable to the user, the server of the trusted source simply provides an attestation of a fact(s) attributable to the user while securely withholding the underlying PII of the user.

Thus, the trusted source acts as an intermediary between the computing device of the user and the requesting authority by receiving PII from the computing device of the user and mapping it to at least one fact attributable to the user in order to provide a binary answer to the requesting authority in place of one or more items of PII in response to an enrollment question/requirement(s) such as "is this John Smith", "is John Smith a U.S. citizen", "does John Smith have a Bachelor of Science degree" and so forth.

Thus, as one example, a user may be attempting to access a facility under the control of a physical access control (PAC) system that requires confirmation of the user's identity. Instead of having to produce their state driver's license or an identification card with the user's picture on it, the present disclosure exploits the use of a trusted source to provide an attestation that the user is who he or she purports to be without having to show anything further to the requesting authority beyond the attestation and an identifier of the user to tie the user to the attestation. The identifier may be, e.g., the user's name and/or a PIN assigned to the user and/or so forth. The actual license and all the PII contained therein (e.g., organ donor status, home address, vision correction information, and other physical limitations that may fall under health privacy laws, etc.) may be shielded from the requesting authority with simply a binary "yes" or "no" provided in response to an inquiry of whether the user is who they purport to be, that is, the user's identity.

Thus, as another example, a user may be going to a job site that is limited to only U.S. citizens. Instead of having to produce their passport or birth certificate, the present disclosure exploits the use of a trusted source to provide an attestation that the user is a U.S. citizen without having to show anything further to the requesting authority beyond the attestation and an identifier of the user to tie the user to the attestation. The identifier may be, e.g., the user's name and/or a PIN assigned to the user and/or so forth. The actual passport and/or birth certificate documents and all the PII contained therein (e.g., places and times of travel and so forth in the case of the passport and parent's names and birthday in the case of the birth certificate) may be shielded from the requesting authority with simply a binary yes or not provided to an inquiry of whether the user is a U.S. citizen. The passport and birth certificate examples can also apply at airports and/or other places where citizenship is a requirement for enrollment.

Thus, as a further example, as another example, a user may be applying for a job that simply requires a Bachelor of Science degree but not the transcript supporting the degree. Instead of having to produce their degree and/or transcript, the present disclosure exploits the use of a trusted source to provide an attestation that the user has a Bachelor of Science degree without having to show anything further to the requesting authority beyond the attestation and an identifier of the user to tie the user to the attestation. The identifier may be, e.g., the user's name and/or a PIN assigned to the user and/or so forth. The actual degree and/or transcript documents and all the PII contained therein may be shielded from the requesting authority with simply a binary yes or not provided to an inquiry of whether the user has a Bachelor of Science degree.

Thus, aspects of the present disclosure provide a way for the trusted source to act as a repository for all or a subset of PII relating to a user and, in particular, one or more documents (also referred to interchangeably herein as "credentials") of a user (e.g., licenses (state driving licenses, professional licenses, and so forth), social security card, passport, birth certificate, bills (utility bills), education degrees, education transcripts, and so forth). The trusted source acts as an intermediary between the computing device of a user and a server of a requesting authority to shield the PII of the user from the requesting authority by providing an attestation of at least one fact attributable to the user and is required for enrollment by the requesting authority. Mapping of one or more items of PII, but preferably less than all, are mapped to a fact that is attributable to a user, and the fact is attested or denied in place of at least the one or more items of PII if not all of the PII found on common credentials.

Referring to FIG. 1, an example computing environment 100 is shown, in accordance with an aspect of the present disclosure.

Computing environment 100 includes an example of an environment for the execution of at least some of the computer code 177 involved in performing the methods, such as high assurance enrollment for identities. The computing environment 100, in addition to computer code 177, further includes for example, client computer 101, wide area network (WAN) 102, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 177, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though computer 101 is not shown in a cloud in FIG. 1. On the other hand, computer 101 is not required to be in a cloud except to any extent as may be affirmatively indicated. Computer 101 may be interchangeably referred to herein as "voice user interface (VUI)-based device" 101.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 177 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101. Relating to an online aspect, volatile memory 112 may include a first buffer 112A for collecting input samples and a second buffer 112B for outputting the processed audio.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 177 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as one or more of a display screen, speaker, microphone array, wearable devices (such as goggles and smart watches), keyboard, mouse, printer, touchpad, virtual reality goggles, augmented reality goggles, mixed reality goggles, game controllers, a voice user interface (VUI), an automatic speech recognition system (ASR), a text-to-speech (TTS) system, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of one or more sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Public cloud 105 may provide a subscription service for people interaction to a plurality of users such as a user of computer 101. The service can have multiple purposes for people interaction. Such purposes for people interaction can include dating, friendship, and business.

In an aspect, public cloud 105 operates in conjunction with remote server 104 to enable profile information of users to be retrieved and provided to a user such as one using computer 101 and/or another user operating a similar device as computer 101.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
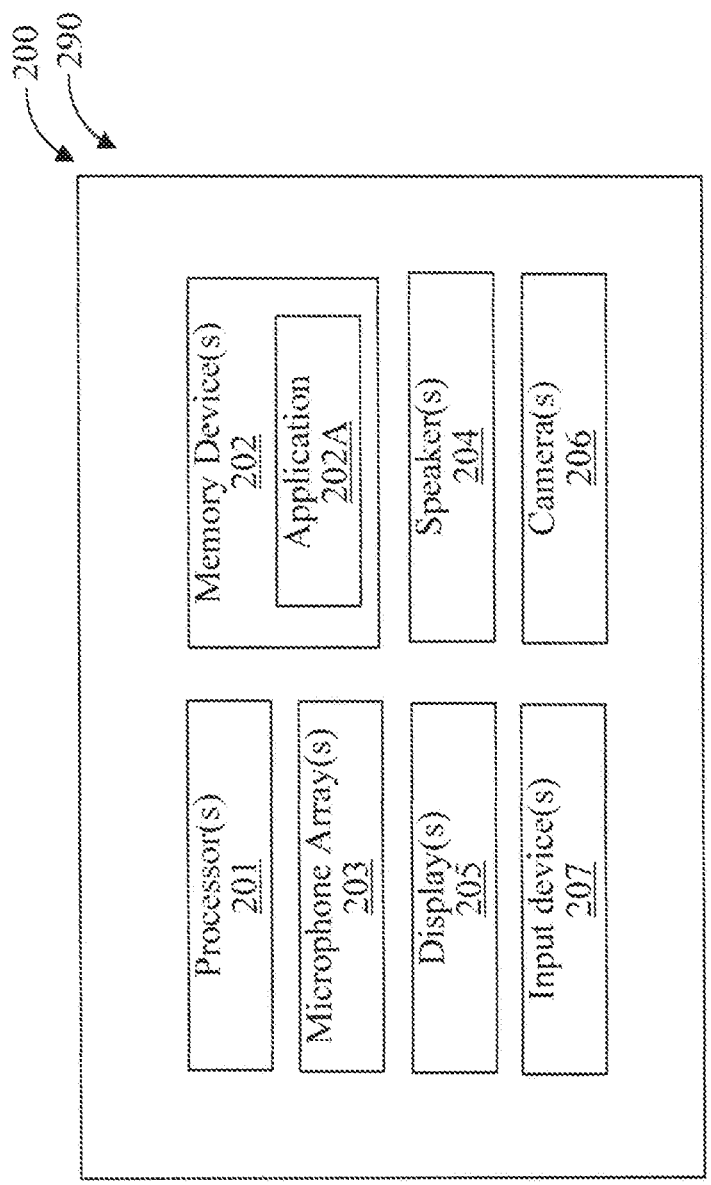
FIG. 2 illustrates a block diagram of another client computer relative to that shown in FIG. 1, in accordance with example aspects of this disclosure.

Referring to FIG. 2, another client computer 200 is shown, in accordance with various aspects of the present disclosure.

The client computer 200 is one variation of client computer 101 of FIG. 1, and may interface with the same devices as shown in FIG. 1. In an aspect, client computer is a mobile computing device such as, for example, but not limited to, a smartphone, a desktop computer, a laptop computer, a tablet computer, a multimedia player, and so forth.

The client computer 200 may include: one or more processors 201; one or more memory devices 202 operatively coupled to the one or more processors 201; one or more microphone arrays 203; one or more speakers 204; one or more displays 205; one or more cameras 206; one or more input devices 207; and so forth.

The one or more processors 201 and the one or more memory devices 202 are configured to run program code to execute a method such as method 600.

The one or more microphone arrays 203 are configured to receive speech from the user. The one or more speakers 204 are configured to audibly reproduce sounds to the user such as user prompts, response to user commands and/or user inquires, and so forth. The one or more displays 205 may display a status of the device as well as responses to user commands and/or user inquiries and other information pertinent to the use of the device by the user. The one or more displays are configured to enable the user to interact with applications stored on the client computer 200. In an aspect, the one or more displays are touchscreen displays that display keyboards for entering information such as PII. The one or more cameras 206 are configured to capture images including images of the user for authentication purposes as biometric information (e.g., PII). The one or more input devices 207 may be used to power up or power down the device, adjust a volume, enter network information including network name and password, and so forth.

The one or more memory devices 202 store an application 202A that is configured to interface with a server of the trusted source. The application 202A is configured to store personal identifying information (PII) of a user, preferably in a secure manner and under the control of the user. In an aspect, the application 202A is a wallet application including PII which may include financial transaction information (debit/credit card numbers, banking account numbers, and so forth). In another aspect, the application 202A is a non-wallet application lacking financial transaction information but including other PII of the user in order to shield the financial transaction information.

Figure 3:
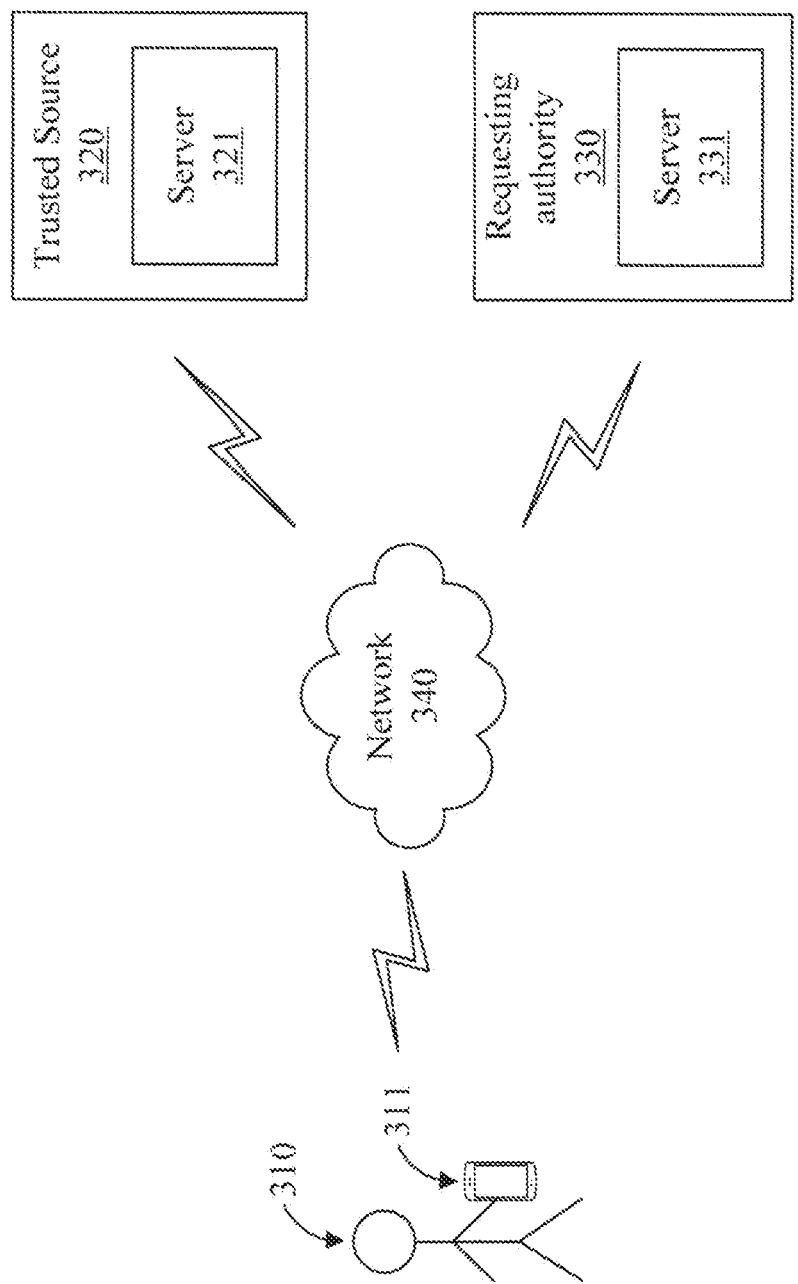
FIG. 3 illustrates a block diagram of an example user environment, in accordance with example aspects of this disclosure.

Referring to FIG. 3, an example environment 300 is shown, in accordance with various aspects of the present disclosure.

The environment 300 includes a computing device 311 of a user 310, a server 321 of a trusted source 320, and a server 331 of a requesting authority 330.

The computing device 311 can be, for example, client computer 101 of FIG. 1 or client computer 200 of FIG. 2 or some other type of computing device. In an aspect, the computing device 311 is a mobile computing device. In such a case, a user may use it to, e.g., gain access to a service or facility. However, computing device 311 may also be a stationary computer (e.g., a desktop), where confirmation of identity and/or other facts attributable to the user is needed, e.g., to gain access to a service.

The server 331 of the requesting authority performs enrollment functions for enrolling a user with a service and/o a facility associated with and/or otherwise controlled by the requesting authority. The service and/or facility associated with the requesting authority may be, for example, a physical access control system, a logical access control system, and so forth. The requesting authority may be and/or otherwise represent any of a bank, a power grid facility, a nuclear facility, a military facility, a bank, a job site, and so forth.

Figure 4:
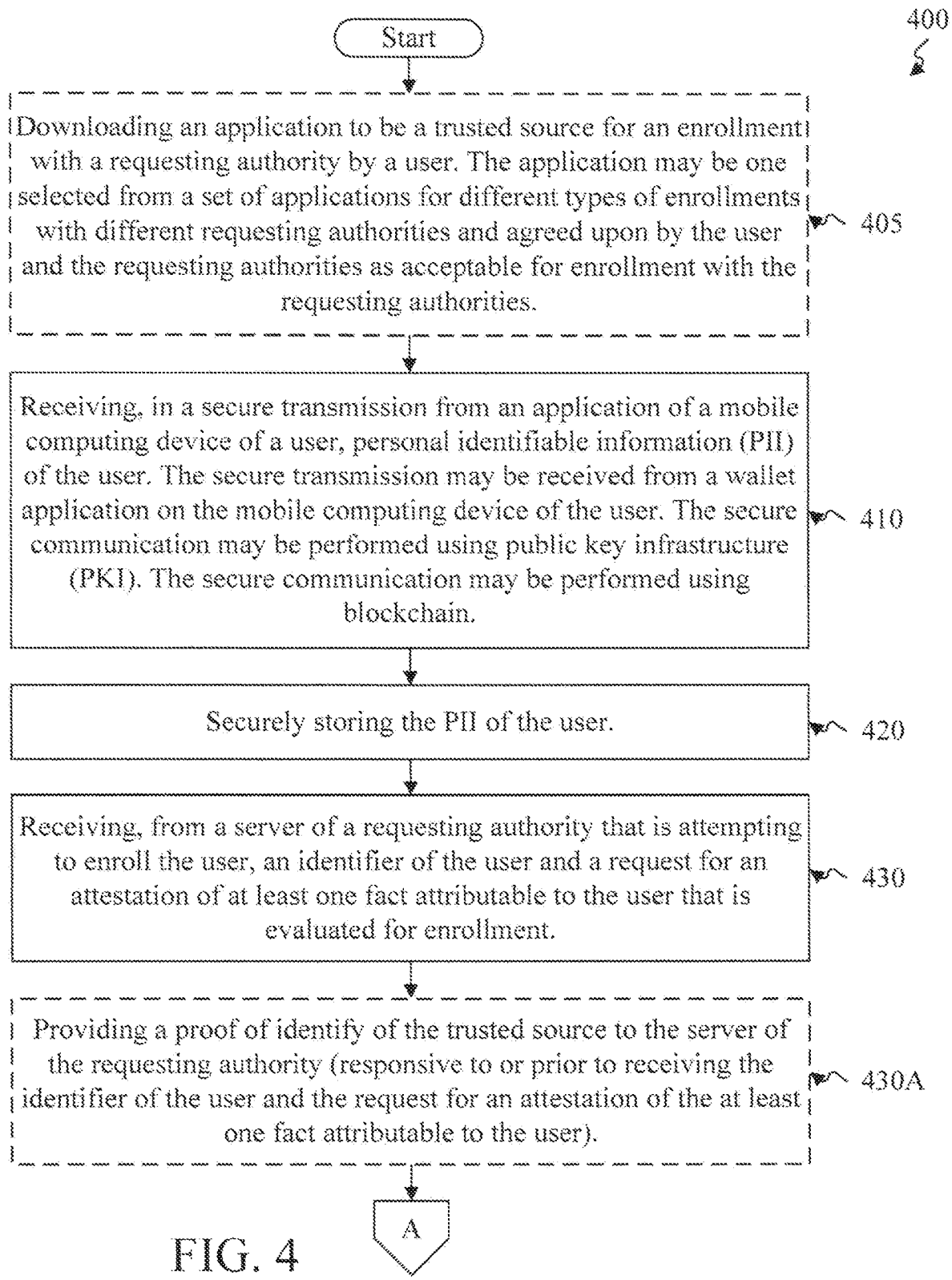
Figure 5:
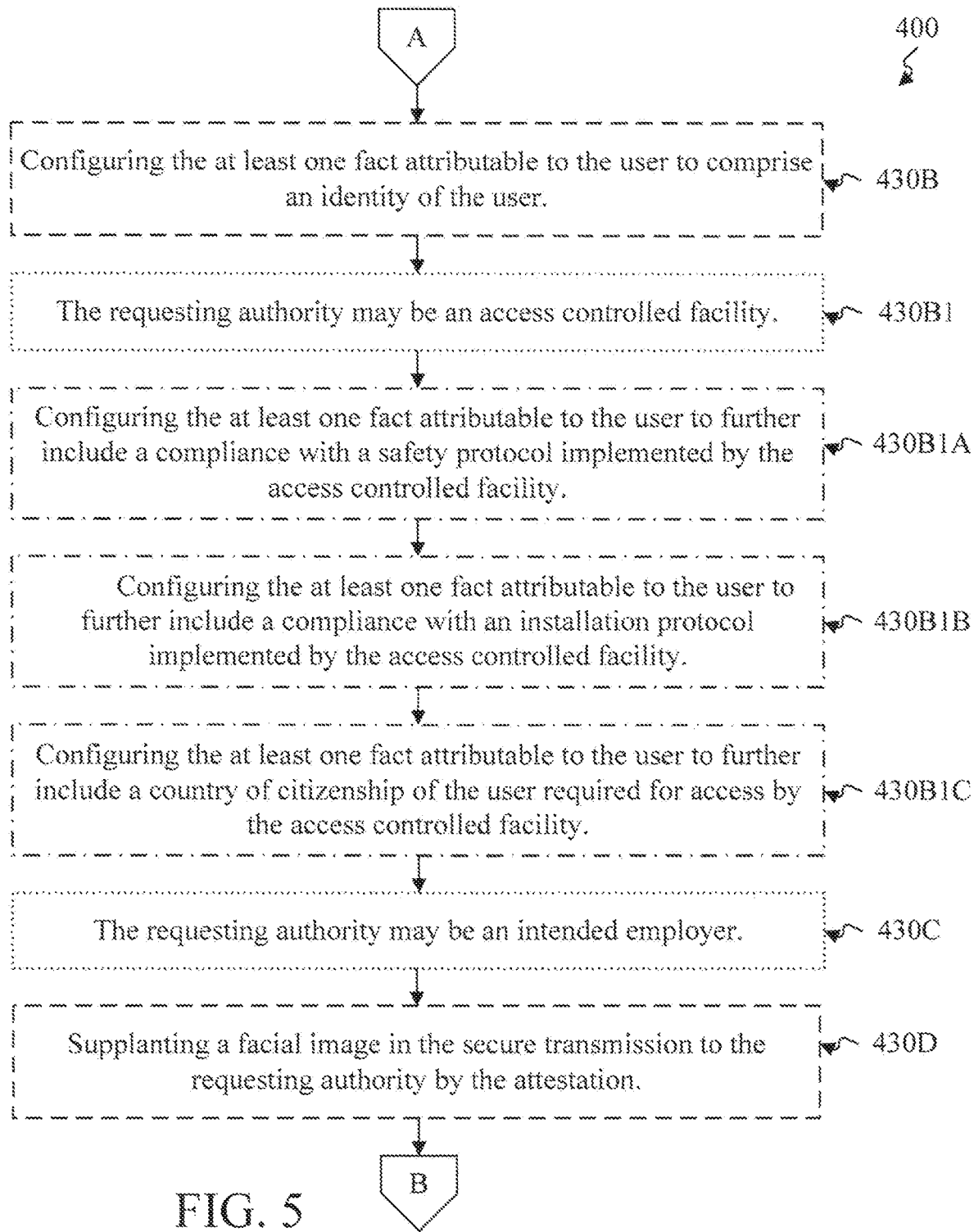
Figure 6:
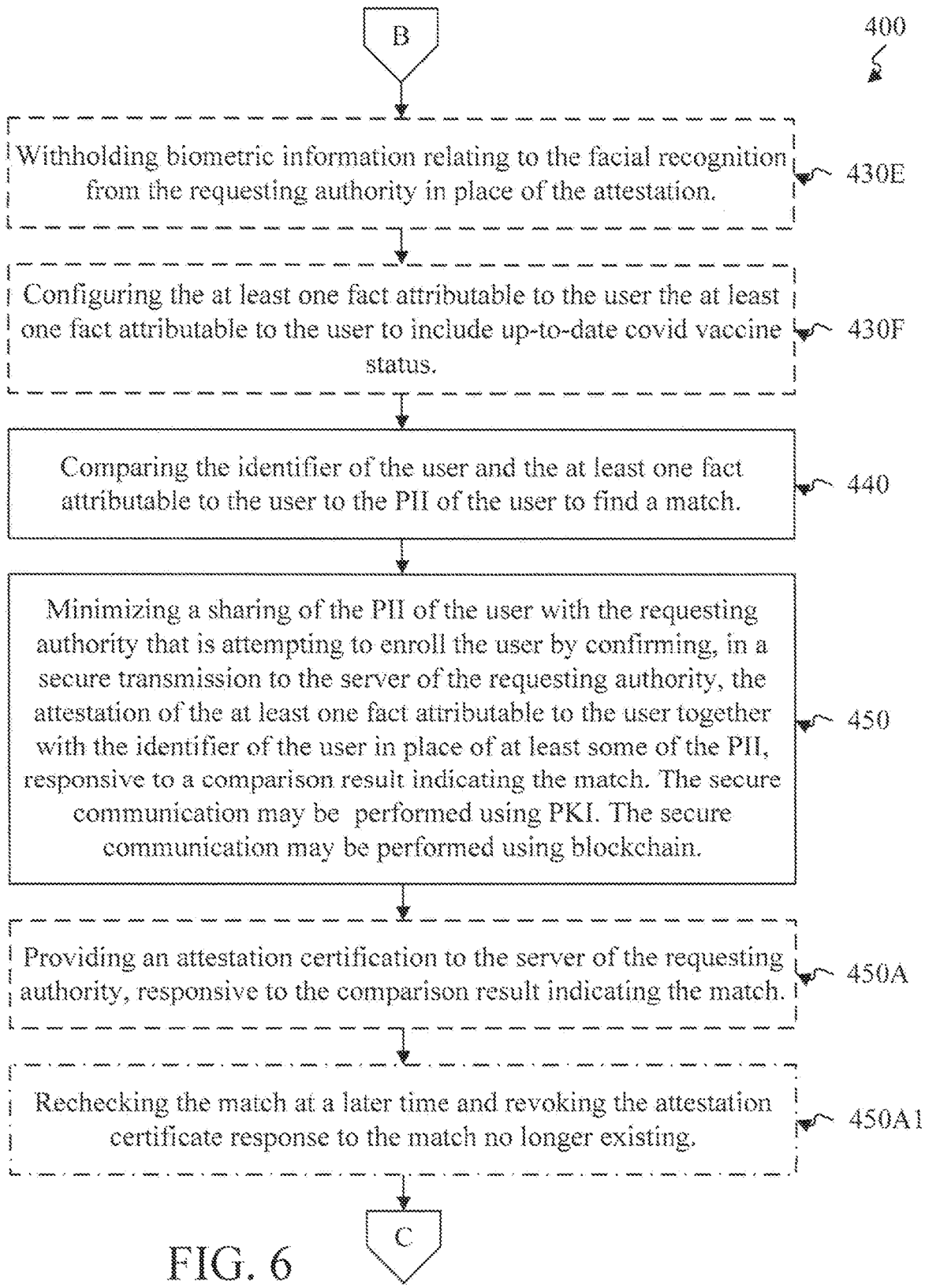

The server 321 of the trusted source 320 may be a server tasked with at least performing enrollment functions such as those specified in method 400 of FIG. 4. In this way, the exchanging of PII is minimized by the replacement of one or more items of PII by the server 321 of the trusted source 320 in providing the requesting authority 330 information it needs for enrollment.

As described herein, the user 310 seeks enrollment with the requesting authority 330. In sum, the server 321 of the trusted source 320 acts as an intermediary between the computing device 311 of the user 310 and the server 331 of the requesting authority 330 by receiving PII from the computing device 311 of the user 310 and mapping it to at least one fact attributable to the user in order to provide a binary answer to the requesting authority in place of one or more items of PII in response to an enrollment question/requirement(s) such as "is this John Smith", "is John Smith a U.S. citizen", "does John Smith have a Bachelor of Science degree" and so forth.

The user 310 may use a wallet application on their computing device 311 that already includes the user's PII. The server 321 of the trusted source 320 may receive a copy of all the PII from the wallet application or may simply a subset of the PII (e.g., the relevant PII to a particular enrollment question/requirement(s) or a predesignated subset from a set of templates of PII corresponding to expected questions from respective requesting authorities).

In an aspect, the computing device 311 of the user 310, the server 321 of the trusted source 320, and the server 331 of the requesting authority 330 use secure communications to communicate with each other over one or more networks 340. In an aspect, such secure communications can involve a public key infrastructure (PKI) to ensure the communications are indeed secure. The trusted source 320 may act as a certificate authority and sign and publish public keys for use by the computing device 311 of the user 310, the server 321 of the trusted source 320, and the server 331 of the requesting authority using the trusted source's 320 private key. In an aspect, a certificate can be revoked once the status of a fact in issue changes. In another aspect, such secure communications can involve a block chain infrastructure to ensure the communications are indeed secure. Other methods of secure communication can be used, as the present disclosure is not dependent on the underlying methodology for providing secure communications between the computing device 311, the server 321, and the server 331, as any secure technology may be used as readily appreciated by one of ordinary skill in the art given the teachings of the present invention provided herein.

Referring now to FIGS. 4-7, a method 400 for facilitating user enrollment by a secure server of a trusted source is shown and described in accordance with various exemplary aspects. Boxes shown in dashes or dashes and dots are optional features. Boxes shows in just dots represent an environment aspect of the steps.

Method 400 may be performed by one or more processors (e.g., processor set 110 of FIG. 1 and processors 201 of FIG. 2) operatively coupled to one or more memories (e.g., persistent storage 113 of FIG. 1 and memory devices 202 of FIG. 2). The server of the trusted source may be implemented, in part, by computer code (e.g., computer code 177 of FIG. 1).

At block 405, the method 400 includes downloading an application to be a trusted source for an enrollment with a requesting authority by a user. The application may be one selected from a set of applications for different types of enrollments with different requesting authorities and agreed upon by the user and the requesting authorities as acceptable for enrollment with the requesting authorities. Such downloaded application would then be executed by, in this case, the server of the trusted source to act as an intermediary between the computing device of the user and the server of the requesting authority. Acceptance of the trusted source may result in the ability of the trusted source to then issue different type of credentials such as PKI certificates, attestation certifications (attesting to one or more facts attributable to the user), and so forth.

At block 410, the method 400 includes receiving, in a secure transmission from an application of a mobile computing device of a user, personal identifiable information (PII) of the user. In an aspect, the PII of the user may include user biometric information. In an aspect, the PII of the user may include at least one of a driver's license number, a social security number, a certification number, at least one training date, and a passport number. In an aspect, the secure transmission may be received from a wallet application on the mobile computing device of the user. In an aspect, the secure communication may be performed using public key infrastructure (PKI) (e.g., messages encrypted/decrypted using a public key/private key). In another aspect, the secure communication may be performed using a blockchain infrastructure (e.g., a shared, immutable ledger that facilitates the process of recording transactions and tracking assets in a network).

At block 420, the method 400 includes securely storing the PII of the user.

At block 430, the method 400 includes receiving, from a server of a requesting authority that is attempting to enroll the user, an identifier of the user and a request for an attestation of at least one fact attributable to the user that is evaluated for enrollment.

In an aspect, block 430 may include one or more of blocks 430A through 430F.

At block 430A, the method 400 includes providing a proof of identify of the trusted source to the server of the requesting authority (responsive to or prior to receiving the identifier of the user and the request for an attestation of the at least one fact attributable to the user).

At block 430B, the method 400 includes configuring the at least one fact attributable to the user to comprise an identity of the user.

In an aspect, block 430B may include one or more of block 430B1 through blocks though blocks 430B3.

At block 430B1, the requesting authority may be an access controlled facility. Examples of an access controlled facility include, but are not limited to, nuclear power facility, a power grid facility, an airport, a government facility, a military facility, and so forth.

In an aspect, block 430B1 may include one or more of blocks 430B1A through 430B1C.

At block 430B 1A, the method 400 includes configuring the at least one fact attributable to the user to further include a compliance with a safety protocol implemented by the access controlled facility.

At block 430B1B, the method 400 includes configuring the at least one fact attributable to the user to further include a compliance with an installation protocol implemented by the access controlled facility.

At block 430B1C, the method 400 includes configuring the at least one fact attributable to the user to further include a country of citizenship of the user required for access by the access controlled facility.

At block 430C, the requesting authority may be an intended employer.

At block 430D, the method 400 further incudes supplanting a facial image in the secure transmission to the requesting authority by the attestation.

At block 430E, the identity of the user may be confirmed by the application using facial recognition, and the method 400 includes withholding biometric information relating to the facial recognition from the requesting authority in place of the attestation.

At block 430F, the method incudes configuring the at least one fact attributable to the user the at least one fact attributable to the user to include up-to-date covid vaccine status.

At block 440, the method 400 includes comparing the identifier of the user and the at least one fact attributable to the user to the PII of the user to find a match.

At block 450, the method 400 includes minimizing a sharing of the PII of the user with the requesting authority that is attempting to enroll the user by confirming, in a secure transmission to the server of the requesting authority, the attestation of the at least one fact attributable to the user together with the identifier of the user in place of at least some of the PII, responsive to a comparison result indicating the match. In an aspect, the secure communication may be performed using PKI. In another aspect, the secure communication may be performed using blockchain.

In an aspect, block 450 may include one or more of block 450A through block 450C.

At block 450A, the method 400 includes providing an attestation certification to the server of the requesting authority, responsive to the comparison result indicating the match.

In an aspect, block 450A may include block 450A1.

At block 450A1, the method 400 includes rechecking the match at a later time and revoking the attestation certificate response to the match no longer existing.

In an aspect block 450A1 may include block 450A1A.

At block 450A1A, the method 400 includes providing a recommendation to the requesting authority to deactivate the user from a remote access system responsive to the match no longer existing.

At block 450B, the method 400 includes using an attestation neural network based model that learns which of the PII to supplant by the attestation in the secure transmission to the server of the requesting authority.

The attestation neural network based model may perform mapping of one or more items of PII to each fact in a set of facts attributable to the user. The set may be populated based on expected or selected enrollments by the user. For example, for national security related jobs, PII indicative of identity (e.g., state driver's license) and citizenship (e.g., passport) may be required to be provided to the trusted source. In an aspect, the mappings are performed by the trusted source. In another aspect, the mapping may be performed by the user using their own PII to map to particular facts that may be expected to be verified for the purpose of enrollment.

In an aspect, block 450B may include one or more of blocks 450B1 and 450B2.

At block 450B1, the method 400 includes configuring the attestation neural network based model to receive the PII of the user and a plurality of seed redaction rules for supplanting certain items of the PII by the attestation.

At block 450B2, the method 400 includes configuring the attestation neural network based model to generate new rules to supplant identical items from the PII of the user across different types of credentials to reduce the sharing of the PII of the user. In this way, a learning model may be created that learns what to supplant from new credentials based on matches to items that are supplanted in other credentials.

Additional aspects of the present disclosure may include one or more of the following clauses.

Clause 1. A computer-implemented method for facilitating user enrollment by a secure server of a trusted source, comprising: receiving, in a secure transmission from an application of a mobile computing device of a user, personal identifiable information (PII) of the user; securely storing the PII of the user; receiving, from a server of a requesting authority that is attempting to enroll the user, an identifier of the user and a request for an attestation of at least one fact attributable to the user that is evaluated for enrollment; comparing the identifier of the user and the at least one fact attributable to the user to the PII of the user to find a match; and minimizing a sharing of the PII of the user with the requesting authority that is attempting to enroll the user by confirming, in a secure transmission to the server of the requesting authority, the attestation of the at least one fact attributable to the user together with the identifier of the user in place of at least some of the PII, responsive to a comparison result indicating the match.

Clause 2. The computer-implemented method in accordance with clause 1, wherein the secure transmission is received from a wallet application on the mobile computing device of the user.

Clause 3. The computer-implemented method in accordance with any preceding clause, further comprising configuring the attestation to supplant one or more pieces of data comprised in the PII of the user and found on a credential that relates to the at least one fact that is attribute to the user.

Clause 4. The computer-implemented method in accordance with any preceding clause, further comprising configuring the attestation to supplant a physical credential that relates to the at least one fact that is attribute to the user and comprises at least some of the PII of the user.

Clause 5. The computer-implemented method in accordance with any preceding clause, further comprising confining the attestation of the at least one fact attributable to the user to a binary value.

Clause 6. The computer-implemented method in accordance with any preceding clause, further comprising configuring the at least one fact attributable to the user to comprise an identity of the user.

Clause 7. The computer-implemented method in accordance with any preceding clause, wherein the requesting authority is an access controlled facility.

Clause 8. The computer-implemented method in accordance with any preceding clause, further comprising configuring the at least one fact attributable to the user to further include a compliance with a safety protocol implemented by the access controlled facility.

Clause 9. The computer-implemented method in accordance with any preceding clause, further comprising configuring the at least one fact attributable to the user further to further include a compliance with an installation protocol implemented by the access controlled facility.

Clause 10. The computer-implemented method in accordance with any preceding clause, further comprising configuring the at least one fact attributable to the user to further include a country of citizenship of the user required for access by the access controlled facility.

Clause 11. The computer-implemented method in accordance with any preceding clause, wherein the requesting authority is an access controlled service.

Clause 12. The computer-implemented method in accordance with any preceding clause, wherein the requesting authority is an intended employer.

Clause 13. The computer-implemented method in accordance with any preceding clause, wherein the PII comprises a facial image, the requesting system has requested an identify confirmation of the user via use of the facial image, and the method further comprises supplanting the facial image in the secure transmission to the requesting authority by the attestation.

Clause 14. The computer-implemented method in accordance with any preceding clause, wherein the identity of the user is confirmed using facial recognition such that the PII of the user includes biometric information relating to the facial recognition that is withheld from the requesting authority in place of the attestation.

Clause 15. The computer-implemented method in accordance with any preceding clause, further comprising using a public key infrastructure for at least one of, the secure transmission between the secure server of the trusted source and the application on the mobile computing device of the user, and the secure transmission between the secure server of the trusted source and the server of the requesting authority.

Clause 16. The computer-implemented method in accordance with any preceding clause, further comprising using a blockchain infrastructure for at least one of, the secure transmission between the secure server of the trusted source and the application on the mobile computing device of the user, and the secure transmission between the secure server of the trusted source and the server of the requesting authority.

Clause 17. The computer-implemented method in accordance with any preceding clause, further comprising providing a proof of identify of the trusted source to the server of the requesting authority responsive to or prior to receiving the identifier of the user and the request for an attestation of the at least one fact attributable to the user.

Clause 18. The computer-implemented method in accordance with any preceding clause, further comprising providing an attestation certification to the server of the requesting authority, responsive to the comparison result indicating the match.

Clause 19. The computer-implemented method in accordance with any preceding clause, further comprising rechecking the match at a later time and revoking the attestation certification response to the match no longer existing.

Clause 20. The computer-implemented method in accordance with any preceding clause, further comprising providing a recommendation to the requesting authority to deactivate the user from a remote access system responsive to the match no longer existing.

Clause 21. The computer-implemented method in accordance with any preceding clause, wherein minimizing the sharing of the PII of the user with the requesting authority comprises using an attestation neural network based model that learns which of the PII to supplant by the attestation in the secure transmission to the server of the requesting authority.

Clause 22. The computer-implemented method in accordance with any preceding clause, further comprising configuring the attestation neural network based model to receive the PII of the user and a plurality of seed redaction rules configured to supplant certain items of the PII by the attestation.

Clause 23. The computer-implemented method in accordance with any preceding clause, further comprising configuring the attestation neural network based model to generate new rules to supplant identical items from the PII of the user across different types of credentials to reduce the sharing of the PII of the user.

Clause 24. The computer-implemented method in accordance with any preceding clause, further comprising configuring the at least one fact attributable to the user to include an up-to-date covid vaccine status.

Clause 25. A computer program product configured to facilitate user enrollment by a secure server of a trusted source, the computer program product comprising one or more non-transitory computer-readable media, having instructions stored thereon that when executed by one or more processors cause the one or more processors, individually or in combination, to perform a method comprising: receiving, in a secure transmission from an application of a mobile computing device of a user, personal identifiable information (PII) of the user; securely storing the PII of the user; receiving, from a server of a requesting authority that is attempting to enroll the user, an identifier of the user and a request for an attestation of at least one fact attributable to the user that is evaluated for enrollment; comparing the identifier of the user and the at least one fact attributable to the user to the PII of the user to find a match; and minimizing a sharing of the PII of the user with the requesting authority that is attempting to enroll the user by confirming, in a secure transmission to the server of the requesting authority, the attestation of the at least one fact attributable to the user together with the identifier of the user in place of at least some of the PII, responsive to a comparison result indicating the match.

Clause 26. The computer program product of clause 25, wherein the instructions when executed by one or more processors are further configured to cause the one or more processors, individually or in combination, to perform the method of any one or any combination of clauses 2 to 24.

Clause 27. A server of a trusted source configured to facilitate user enrollment, the server comprising: one or more memory devices having program code stored thereon, one or more processors, operatively coupled to the one or more memory devices, for running the program code, individually or in combination, to: receive, in a secure transmission from an application of a mobile computing device of a user, personal identifiable information (PII) of the user; securely store the PII of the user in at least one of the one or more memory devices; receive, from a server of a requesting authority that is attempting to enroll the user, an identifier of the user and a request for an attestation of at least one fact attributable to the user that is evaluated for enrollment; compare the identifier of the user and the at least one fact attributable to the user to the PII of the user to find a match; and minimize a sharing of the PII of the user with the requesting authority that is attempting to enroll the user by confirming, in a secure transmission to the server of the requesting authority, the attestation of the at least one fact attributable to the user together with the identifier of the user in place of at least some of the PII, responsive to a comparison result indicating the match.

Clause 28: The server of clause 27, wherein the one or more processors, individually or in combination, are further configured to perform the method of any one or any combination of clauses 2 to 24.

Clause 29. A computer device of a user configured to interact with a server of a trusted source to perform that method of any one or any combination of clauses 1 to 24.

Various aspects of the disclosure may take the form of an entirely or partially hardware aspect, an entirely or partially software aspect, or a combination of software and hardware. Furthermore, as described herein, various aspects of the disclosure (e.g., systems and methods) may take the form of a computer program product comprising a computer-readable non-transitory storage medium having computer-accessible instructions (e.g., computer-readable and/or computer-executable instructions) such as computer software, encoded or otherwise embodied in such storage medium. Those instructions can be read or otherwise accessed and executed by one or more processors to perform or permit the performance of the operations described herein. The instructions can be provided in any suitable form, such as source code, compiled code, interpreted code, executable code, static code, dynamic code, assembler code, combinations of the foregoing, and the like. Any suitable computer-readable non-transitory storage medium may be utilized to form the computer program product. For instance, the computer-readable medium may include any tangible non-transitory medium for storing information in a form readable or otherwise accessible by one or more computers or processor (s) functionally coupled thereto. Non-transitory storage media can include read-only memory (ROM); random access memory (RAM); magnetic disk storage media; optical storage media; flash memory, and so forth.

Aspects of this disclosure are described herein with reference to block diagrams and flowchart illustrations of methods, systems, apparatuses, and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into a general-purpose computer, a special-purpose computer, or another programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps, or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to the arrangement of steps or operational flow; plain meaning derived from grammatical organization or punctuation; the number or type of aspects described in the specification or annexed drawings; or the like.

As used in this disclosure, including the annexed drawings, the terms "component," "module," "system," and the like are intended to refer to a computer-related entity or an entity related to an apparatus with one or more specific functionalities. The entity can be either hardware, a combination of hardware and software, software, or software in execution. One or more of such entities are also referred to as "functional elements." As an example, a component can be a process running on a processor, a processor, an object, an executable, a thread of execution, a program, and/or a computer. For example, both an application running on a server or network controller, and the server or network controller can be a component. One or more components can reside within a process and/or thread of execution and a component can be localized on one computer and/or distributed between two or more computers. Also, these components can execute from various computer readable media having various data structures stored thereon.

The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which parts can be controlled or otherwise operated by program code executed by a processor. As yet another example, a component can be an apparatus that provides specific functionality through electronic components without mechanical parts, the electronic components can include a processor to execute program code that provides, at least partially, the functionality of the electronic components. As still another example, interface(s) can include I/O components or Application Programming Interface (API) components. While the foregoing examples are directed to aspects of a component, the exemplified aspects or features also apply to a system, module, and similar.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in this specification and annexed drawings should be construed to mean "one or more" unless specified otherwise or clear from context to be directed to a singular form.

In addition, the terms "example" and "such as" and "e.g." are utilized herein to mean serving as an instance or illustration. Any aspect or design described herein as an "example" or referred to in connection with a "such as" clause or "e.g." is not necessarily to be construed as preferred or advantageous over other aspects or designs described herein. Rather, use of the terms "example" or "such as" or "e.g." is intended to present concepts in a concrete fashion. The terms "first," "second," "third," and so forth, as used in the claims and description, unless otherwise clear by context, is for clarity only and does not necessarily indicate or imply any order in time or space.

The term "processor," as utilized in this disclosure, can refer to any computing processing unit or device comprising processing circuitry that can operate on data and/or signaling. A computing processing unit or device can include, for example, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can include an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. In some cases, processors can exploit nano-scale architectures, such as molecular and quantum-dot based transistors, switches and gates, in order to optimize space usage or enhance performance of user equipment. A processor may also be implemented as a combination of computing processing units.

In addition, terms such as "store," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. Moreover, a memory component can be removable or affixed to a functional element (e.g., device, server).

Simply as an illustration, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects described herein can be implemented as a method, apparatus, or article of manufacture using special programming as described herein. In addition, various of the aspects disclosed herein also can be implemented by means of program modules or other types of computer program instructions specially configured as described herein and stored in a memory device and executed individually or in combination by one or more processors, or other combination of hardware and software, or hardware and firmware. Such specially configured program modules or computer program instructions, as described herein, can be loaded onto a general-purpose computer, a special-purpose computer, or another type of programmable data processing apparatus to produce a machine, such that the instructions which execute on the computer or other programmable data processing apparatus create a means for implementing the functionality of disclosed herein.

The term "article of manufacture" as used herein is intended to encompass a computer program accessible from any non-transitory computer-readable device, carrier, or media. For example, computer readable media can include but are not limited to magnetic storage devices (e.g., hard drive disk, floppy disk, magnetic strips, or similar), optical discs (e.g., compact disc (CD), digital versatile disc (DVD), blu-ray disc (BD), or similar), smart cards, and flash memory devices (e.g., card, stick, key drive, or similar).

The detailed description set forth herein in connection with the annexed figures is intended as a description of various configurations or implementations and is not intended to represent the only configurations or implementations in which the concepts described herein may be practiced. The detailed description includes specific details for the purpose of providing a thorough understanding of various concepts. However, it will be apparent to those skilled in the art that these concepts may be practiced without these specific details or with variations of these specific details. In some instances, well-known components are shown in block diagram form, while some blocks may be representative of one or more well-known components.

The previous description of the disclosure is provided to enable a person skilled in the art to make or use the disclosure. Various modifications to the disclosure will be readily apparent to those skilled in the art, and the common principles defined herein may be applied to other variations without departing from the scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A computer-implemented method for facilitating user enrollment by a secure server of a trusted source, comprising:
    receiving, in a secure transmission from an application of a mobile computing device of a user, personal identifiable information (PII) of the user;
    securely storing the PII of the user;
    receiving, from a server of a requesting authority that is attempting to enroll the user, an identifier of the user and a request for an attestation of at least one fact attributable to the user that is evaluated for enrollment;
    comparing the identifier of the user and the at least one fact attributable to the user to the PII of the user to find a match;
    minimizing a sharing of the PII of the user with the requesting authority that is attempting to enroll the user by confirming, in a secure transmission to the server of the requesting authority, the attestation of the at least one fact attributable to the user together with the identifier of the user in place of at least some of the PII, responsive to a comparison result indicating the match; and
    providing a recommendation to the requesting authority to deactivate the user from a remote access system responsive to the match no longer existing.

2. The computer-implemented method in accordance with claim 1, wherein the secure transmission is received from a wallet application on the mobile computing device of the user.

3. The computer-implemented method in accordance with claim 1, further comprising configuring the attestation to supplant one or more pieces of data comprised in the PII of the user and found on a credential that relates to the at least one fact that is attribute to the user.

4. The computer-implemented method in accordance with claim 1, further comprising configuring the attestation to supplant a physical credential that relates to the at least one fact that is attribute to the user and comprises at least some of the PII of the user.

5. The computer-implemented method in accordance with claim 1, further comprising confining the attestation of the at least one fact attributable to the user to a binary value.

6. The computer-implemented method in accordance with claim 1, further comprising configuring the at least one fact attributable to the user to comprise an identity of the user.

7. The computer-implemented method in accordance with claim 6, wherein the requesting authority is an access controlled facility.

8. The computer-implemented method in accordance with claim 7, further comprising configuring the at least one fact attributable to the user to further include a compliance with a safety protocol implemented by the access controlled facility.

9. The computer-implemented method in accordance with claim 7, further comprising configuring the at least one fact attributable to the user further to further include a compliance with an installation protocol implemented by the access controlled facility.

10. The computer-implemented method in accordance with claim 7, further comprising configuring the at least one fact attributable to the user to further include a country of citizenship of the user required for access by the access controlled facility.

11. The computer-implemented method in accordance with claim 6, wherein the requesting authority is an access controlled service.

12. The computer-implemented method in accordance with claim 6, wherein the requesting authority is an intended employer.

13. The computer-implemented method in accordance with claim 6, wherein the PII comprises a facial image, the requesting authority has requested an identify confirmation of the user via use of the facial image, and the method further comprises supplanting the facial image in the secure transmission to the requesting authority by the attestation.

14. The computer-implemented method in accordance with claim 6, wherein the identity of the user is confirmed using facial recognition such that the PII of the user includes biometric information relating to the facial recognition that is withheld from the requesting authority in place of the attestation.

15. The computer-implemented method in accordance with claim 1, further comprising using a public key infrastructure for at least one of, the secure transmission between the secure server of the trusted source and the application on the mobile computing device of the user, and the secure transmission between the secure server of the trusted source and the server of the requesting authority.

16. The computer-implemented method in accordance with claim 1, further comprising using a blockchain infrastructure for at least one of, the secure transmission between the secure server of the trusted source and the application on the mobile computing device of the user, and the secure transmission between the secure server of the trusted source and the server of the requesting authority.

17. The computer-implemented method in accordance with claim 1, further comprising providing a proof of identify of the trusted source to the server of the requesting authority responsive to or prior to receiving the identifier of the user and the request for an attestation of the at least one fact attributable to the user.

18. The computer-implemented method in accordance with claim 1, further comprising providing an attestation certification to the server of the requesting authority, responsive to the comparison result indicating the match.

19. The computer-implemented method in accordance with claim 18, further comprising rechecking the match at a later time and revoking the attestation certification responsive to the match no longer existing.

20. The computer-implemented method in accordance with claim 1, wherein minimizing the sharing of the PII of the user with the requesting authority comprises using an attestation neural network based model that learns which of the PII to supplant by the attestation in the secure transmission to the server of the requesting authority.

21. The computer-implemented method in accordance with claim 20, further comprising configuring the attestation neural network based model to receive the PII of the user and a plurality of seed redaction rules configured to supplant certain items of the PII by the attestation.

22. The computer-implemented method in accordance with claim 20, further comprising configuring the attestation neural network based model to generate new rules to supplant identical items from the PII of the user across different types of credentials to reduce the sharing of the PII of the user.

23. The computer-implemented method in accordance with claim 1, further comprising configuring the at least one fact attributable to the user to include an up-to-date covid vaccine status.

24. A computer program product configured to facilitate user enrollment by a secure server of a trusted source, the computer program product comprising one or more non-transitory computer-readable media, having instructions stored thereon that when executed by one or more processors cause the one or more processors, individually or in combination, to perform a method comprising:
- receiving, in a secure transmission from an application of a mobile computing device of a user, personal identifiable information (PII) of the user;
- securely storing the PII of the user;
- receiving, from a server of a requesting authority that is attempting to enroll the user, an identifier of the user and a request for an attestation of at least one fact attributable to the user that is evaluated for enrollment;
- comparing the identifier of the user and the at least one fact attributable to the user to the PII of the user to find a match;
- minimizing a sharing of the PII of the user with the requesting authority that is attempting to enroll the user by confirming, in a secure transmission to the server of the requesting authority, the attestation of the at least one fact attributable to the user together with the identifier of the user in place of at least some of the PII, responsive to a comparison result indicating the match; and
- providing a recommendation to the requesting authority to deactivate the user from a remote access system responsive to the match no longer existing.

25. A server of a trusted source configured to facilitate user enrollment, the server comprising:
- one or more memory devices having program code stored thereon,
- one or more processors, operatively coupled to the one or more memory devices, for running the program code, individually or in combination, to:
  - receive, in a secure transmission from an application of a mobile computing device of a user, personal identifiable information (PII) of the user;
  - securely store the PII of the user in at least one of the one or more memory devices;
  - receive, from a server of a requesting authority that is attempting to enroll the user, an identifier of the user and a request for an attestation of at least one fact attributable to the user that is evaluated for enrollment;
  - compare the identifier of the user and the at least one fact attributable to the user to the PII of the user to find a match;
  - minimize a sharing of the PII of the user with the requesting authority that is attempting to enroll the user by confirming, in a secure transmission to the server of the requesting authority, the attestation of the at least one fact attributable to the user together with the identifier of the user in place of at least some of the PII, responsive to a comparison result indicating the match; and
  - provide a recommendation to the requesting authority to deactivate the user from a remote access system responsive to the match no longer existing.

* * * * *